United States Patent
Amar et al.

(10) Patent No.: US 11,134,065 B2
(45) Date of Patent: Sep. 28, 2021

(54) SECURED EXTENDED RANGE APPLICATION DATA EXCHANGE

(71) Applicant: Visa International Service Association, San Francisco, CA (US)

(72) Inventors: Sumit Amar, Foster City, CA (US); Saloni Mahajan, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 212 days.

(21) Appl. No.: 16/211,771

(22) Filed: Dec. 6, 2018

(65) Prior Publication Data
US 2020/0186505 A1   Jun. 11, 2020

(51) Int. Cl.
   *H04L 29/06*   (2006.01)
   *H04W 76/10*   (2018.01)
   *H04W 4/80*   (2018.01)

(52) U.S. Cl.
   CPC ........... *H04L 63/0435* (2013.01); *H04W 4/80* (2018.02); *H04W 76/10* (2018.02)

(58) Field of Classification Search
   CPC ... H04L 63/0435; H04L 67/303; H04L 67/32; H04L 29/06; H04W 4/80; H04W 76/10; H04W 12/02; H04W 12/0609; H04W 76/00; H04W 76/11; H04W 76/30–36
   See application file for complete search history.

(56) References Cited

U.S. PATENT DOCUMENTS 10,261,935 B1 * 4/2019 Habusha .............. G06F 11/3433
10,270,836 B2 * 4/2019 Lee ......................... H04L 67/02
2015/0127529 A1 * 5/2015 Makhotin .............. G06Q 20/24
                                                                705/39
2018/0189783 A1   7/2018 Flurscheim et al.
2018/0232722 A1   8/2018 Wong et al.
2018/0249312 A1 * 8/2018 Roh .................. H04W 12/0608
2018/0330360 A1  11/2018 Chen et al.
2019/0379542 A1 * 12/2019 Michael .............. G06F 13/4282

FOREIGN PATENT DOCUMENTS

| EP | 3101607 | 12/2016 |
|---|---|---|
| WO | 2016032563 | 3/2016 |

OTHER PUBLICATIONS

PCT/US2019/063251, "International Search Report and Written Opinion Received", dated Mar. 16, 2020, 11 pages.

* cited by examiner

*Primary Examiner* — Quazi Farooqui
(74) *Attorney, Agent, or Firm* — Kilpatrick Townsend & Stockton LLP

(57) ABSTRACT

An application data exchange technique may include a communication device establishing a communication channel with an access device, receiving an access device profile of the access device, and emulating a virtual access device on the communication device based on the access device profile. The virtual access device executing on the communication device may issue a set of application commands to a transaction applet executing on the communication device, and receive a set of application data responses from the transaction applet in response to the set of application commands. The communication device, may then generate a data packet by concatenating application data contained in the set of application data responses, and transmitting the data packet to the access device via the communication channel.

20 Claims, 5 Drawing Sheets

SECURED EXTENDED RANGE APPLICATION DATA EXCHANGE

BACKGROUND

Near Field Communication (NFC) is a wireless communication technology that allows close proximity data exchange. Because NFC requires the devices to be placed within inches of each other, the NFC data exchange is fairly safe from interception by perpetrators at a distance. The close proximity requirement of NFC also means that it is unlikely to experience interference caused by objects along the communication path. As such, a stable connection can be achieved so long as the devices remains close to each other, and data exchange can be carried out over a series of uninterrupted back and forth transmissions. However, NFC has a limited communication range, and may cause user experience friction, for example, by requiring a user to take the NFC-enabled communication device out of his/her pocket and place it next to a NFC-enabled reader device.

Embodiments of the present invention address these and other problems individually and collectively.

BRIEF SUMMARY

According to some embodiments, a technique for application data exchange may include a user's communication device establishing a communication channel with an access device, receiving an access device profile of the access device, and emulating a virtual access device on the communication device based on the access device profile. The virtual access device executing on the communication device may issue a set of application commands to a transaction applet executing on the communication device, and receive a set of application data responses from the transaction applet in response to the set of application commands. The communication device, may then generate a data packet by concatenating application data contained in the set of application data responses, and transmitting the data packet to the access device via the communication channel.

According to some embodiments, a communication device may include a processor, and a memory coupled to the processor and storing code executable by the processor to cause the communication device to perform the above technique for application data exchange.

DETAILED DESCRIPTION

Figure 1:
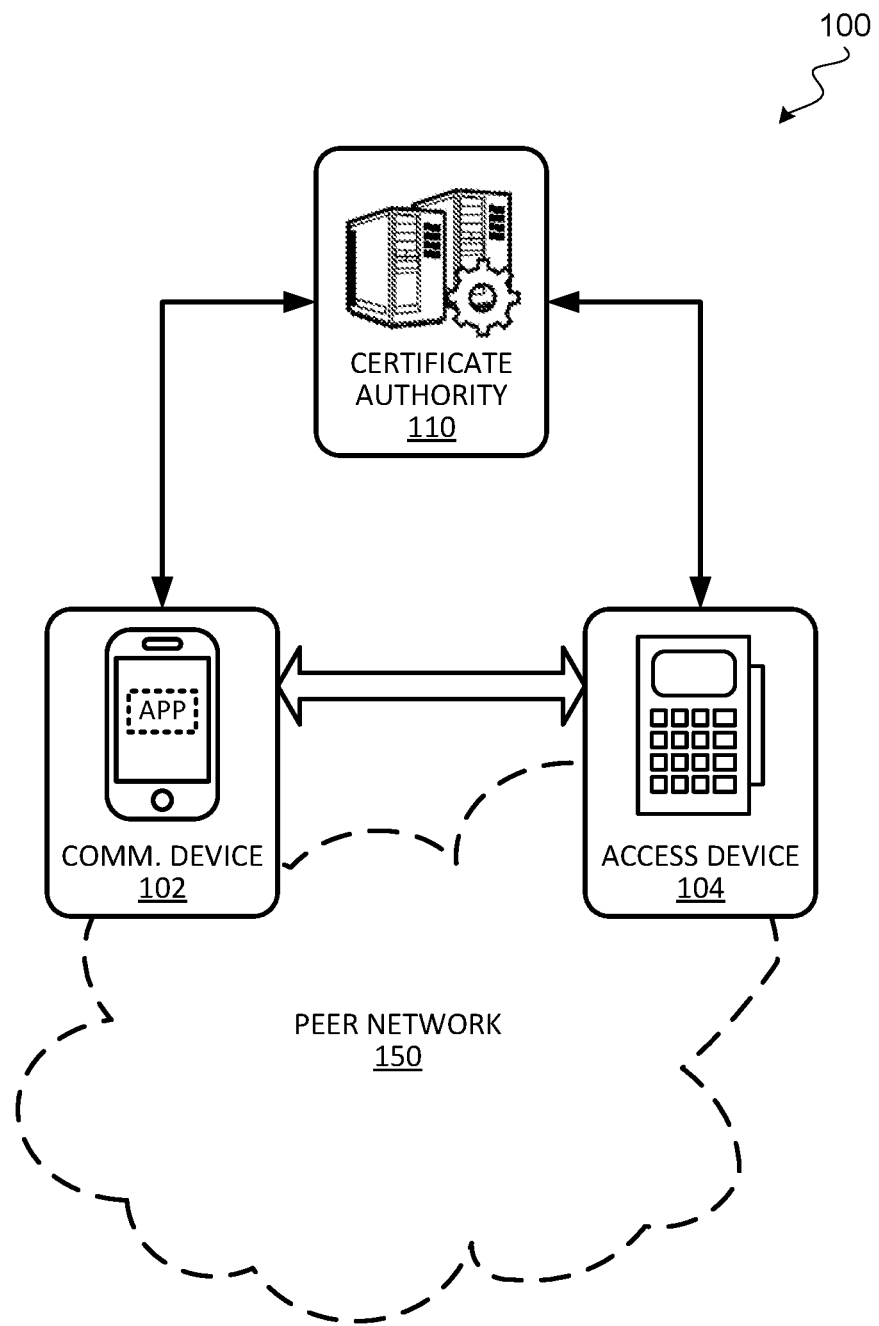
FIG. 1 illustrates a block diagram of a system for secured extended range application data exchange, according to some embodiments.

Techniques for secured extended range application data exchange are described. The extended range application data exchange can be carried out using a longer range wireless communication technology such as the Bluetooth family of protocols including Bluetooth Low Energy (BLE). As compared to close proximity implementations such as NFC, additional care is taken to ensure that the data exchange over a longer distance is conducted in a reliable and secured manner. In some embodiments, the devices communicating with each other may use digital certificates to achieve mutual authentication and to provide encryption for the data exchange. In order to mitigate against connectivity interruptions, an initiating device (e.g., a user's communication device) communicating with a target device (e.g., an access device) may emulate a virtual target device locally on the initiating device. The emulated virtual target device can interact with the initiating device locally within the initiating device, and application data that is typically provided over a series of transmissions can be cached locally on the initiating device and be transmitted to the target device in a single or reduced number of transmissions.

Prior to discussing the details of the various embodiments, an explanation of various terms are provided below.

A "wireless communication protocol" may refer to a specified technique for allowing two or more devices to exchange data with each other without requiring a physical wired connection between the devices. A wireless communication protocol can be a standardized communication protocol or be a proprietary communication protocol. Examples of wireless communication protocols may include Bluetooth, Bluetooth Low Energy (BLE), WiFi, WiFi-Direct, Zigbee, Z-Wave, NFC, RFID, etc.

A "communication device" may refer to a device that includes one or more electronic components (e.g., an integrated chip) that can communicate with another device or entity. For example, a communication device can be a computing device that includes at least one processor coupled to a memory that stores instructions or code for execution by the processor, and may include a communication interface such as a transceiver that allows the communication device to interact with other entities. A communication device can be a portable communication device that can be transported and operated by a user. A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable device (e.g., watch, bracelet, ring, eyeglasses, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle). Other examples of communication devices may include Internet of Things (IoT) devices, smart appliances and electronics, gaming consoles, etc. A communication device may also include multiple devices or components (e.g., when a device has remote access to a network by tethering to another device—both devices taken together may be considered a communication device). Communication devices that may be communicatively coupled with each other within a device network may be referred to as "peer devices."

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, a server computer can be located remotely from a device communicating with the server computer, and the remote server computer may be referred to as the "cloud."

An "access device" may refer to a suitable device for communicating with a resource provider. An access device may generally be located in any suitable location, such as at the location of the service provider or a merchant, or can be at a remote location (e.g., in the cloud). Examples of an access devices may include a point-of-sale (POS) device, a personal computers (PCs), tablet PCs, hand-held specialized readers, set-top boxes, electronic cash registers (ECRs), automated teller machines (ATMs), virtual cash registers (VCRs), kiosks, security systems, access systems, etc. An access device can also be a web server, a merchant computer, or a transaction processing network that can interact with a user's communication device. A user's communication device such as a user's mobile device can also act as an access device. An access device may use any suitable contact or contactless mode of operation to send or receive data with a communication device. An access device may include a processor, a computer-readable medium, and a device reader. A device reader may include contact and/or contactless mode of operations. For example, a card reader can include one or more radio frequency (RF) antenna, optical scanners bar code reader, or magnetic stripe reader to interact with a communication device.

A "token" may be a substitute for sensitive information. A token may refer to information that can be transmitted or use in place of the sensitive information. For example, a token can be a substitute for sensitive information such as a real account identifier, and the token may be used in place of the real account identifier to conduct access the account. In the payment context, a payment token may be an identifier for a payment account and act as a substitute for the real account identifier (e.g., a primary account number (PAN)). A token may include a series of alphanumeric characters that may be used as a substitute for an original account identifier. For example, a token "4900 0000 0000 0001" may be used in place of a primary account number (PAN) "4147 0900 0000 1234." In some embodiments, a token may be format preserving and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token can be generated in a manner such that the recovery of the original sensitive information (e.g., PAN) may not be algorithmically or computationally derived. For example, a token may include random numbers so that the PAN associated with the token is not computationally derivable from the token. A lookup table may be used to associate a PAN and a corresponding token. In some embodiments, a token can be a non-payment token that is used as a substitute for other types of sensitive information.

An "issuer" may typically refer to a business entity (e.g., a bank) that maintains an account (e.g., a financial account) for a user. The account can be enrolled in an application installed on a communication device of the user to allow the user to conduct transactions on the account via the communication device. A "merchant" may typically be an entity that engages in transactions and can sell goods or services, or provide access to goods or services. An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or transaction processing network (e.g., payment processing network), and for interacting with a consumer communication device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a consumer communication device. In some embodiments, where an access device may comprise a Point-of-Sale (POS) terminal, any suitable POS terminal may be used and may include a reader, a processor, and a computer-readable medium. For example, exemplary readers can include radio frequency (RF) antennas, optical scanners, bar code readers, or magnetic stripe readers to interact with a consumer communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

"Provisioning" may include a process of providing data for use. For example, provisioning may include providing, delivering, or enabling a token and/or a limited-use key (LUK) on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

A "user" may refer to an entity such as a person, an organization, or a device or system associated with or operated by the person or organization that utilizes a resource for some purpose. A user may have one or more accounts that can be used to access the resource. A user may also be referred to as an account holder, a consumer, a subscriber, or a cardholder, etc.

A "resource" may refer to a service, an item, a location, data, information, or something of value that assists a user with achieving some purpose. Some resources may be restricted, and may require a user to have an account to access the resource. Examples of resources may include software applications and related functions; online services including cloud services; goods (virtual and/or physical objects) or services related to transactions; credits, points, and/or currencies that can be exchanged for other resources; electronic devices such as servers, computers, mobile devices, gaming systems, etc.; transportation such as vehicles or transit services, communications capabilities such as wireless services; restricted areas; media content; etc.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account. Examples of a dynamic account parameter may include a limited-use key that is used as an encryption key to generate transaction cryptograms. Examples of a semi-static account parameter may include a token that is a substitute for a real account identifier.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc. In some embodiments, a key may be a limited-use key (LUK) that is subject to one or more limited-use thresholds to limit the usage of the LUK, which once exceeded, the LUK is no longer valid, and further usage of the LUK may require replenishment or renewal of the LUK.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

The term "authentication" and its derivatives may refer to a process by which the credential of an endpoint (including but not limited to applications, people, devices, processes, and systems) can be verified to ensure that the endpoint is who they are declared to be.

A "transaction processing network" may include a network of one or more devices that can process and route transaction request and/or response messages. A transaction processing network may include data processing subsystems and operations used to support and deliver authorization services, exception file services, transaction scoring services, and clearing and settlement services. An exemplary transaction processing network may include VisaNet™. Transaction processing network such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

A "digital certificate" may refer to an electronic document used to demonstrate ownership. A digital certificate can include a public key or information about a public key, along with the identity of the owner of that public key, and a digital signature (e.g., data which indicates the entity that verified that the listed owner actually owns the public key). This digital signature can be a message encrypted using the verifying entity's private key. An entity can decrypt the message using the verifying entity's public key to identify the verifying entity.

A "certificate authority" may refer to a trusted entity that issues certificates to other entities to certify the identities. For example, a certificate authority may issue a digital certificate that includes information about a cryptographic key and information about the identity of the owner of the key. The digital certificate can be signed by the certificate authority to certify the validity of the certificate's contents. Examples of a certificate authority may include network operator, web domain provider, transaction processor or processing network, etc.

A "signature" may refer to an electronic signature for a message or some data. A digital signature may be a numeric data value, an alphanumeric data value, or any other type of data including a graphical representation. A digital signature may be a unique data value generated from a message and a private key using an encrypting algorithm. In some embodiments, a validation algorithm using a public key may be used to verify the signature.

NFC technology has enabled a user's communication device to exchange application data with an access device to conduct close proximity transactions. The distance between the user's communication device and the access device communicating via NFC can be 4 cm or less, which practically inhibits a perpetrator at a distance from intercepting the data exchange. A transaction is authorized after certain information interchange between the devices takes place. These interchanges can be a series of Application Protocol Data Unit (APDU) commands and responses. The back and forth NFC communications to process a transaction can take less than 500 milliseconds to complete. However, despite these advantages, close proximity solutions such as NFC still require a user to be physically next to an access device, limiting the versatility and user experience of such solutions.

In order to achieve a more hands-free and seamless transaction mechanism, a longer range wireless communication protocol such as the Bluetooth family of protocols including BLE can be used. By employing a longer range wireless communication protocol, a user's communication device can communicate with an access device located at some distance away. However, unlike NFC, the longer communication range invites rogue parties to intercept the data traffic and cause man-in-the-middle attacks. The longer communication range also raises pairing and reliability concerns, and can be prone to connection drops when many devices are in vicinity of each other. These shortcomings have thus far prevented wide adoption of such longer range wireless communication protocols for conducting transactions, or more generally for exchanging sensitive data. Nevertheless, the techniques described herein can enhance the security and reliability of such longer range wireless communication protocols to make such protocols suitable for conducting transactions and exchange of sensitive data.

FIG. 1 illustrates a block diagram of a system 100 for secured extended range application data exchange, according to some embodiments. System 100 may include a user's communication device 102, an access device 104, and a certificate authority server 110 operated by a certificate authority. Communication device 102 and access device 104 can be present at the same location (e.g., a merchant store location), and may form a peer network 150 with communication devices operated by other users and/or other access devices nearby using a wireless communication protocol such as BLE or other suitable protocol. Certificate authority server 110 can be located remotely or be at the same location as peer network 150. Certificate authority server 110 may communicate with communication device 102 and/or access device 104 using the same wireless communication protocol as peer network 150 (e.g., BLE) if at the same location, or some other Internet accessible wireless protocol such as WiFi or cellular network protocol if located remotely.

Communication device 102 can be, for example, a mobile or wearable device, an IoT device, a vehicle's infosystem, or other communication device that can have a transaction application installed onto the communication device to provide functionality to conduct a transaction with an access device using a wireless communication protocol. The transaction application may provide functionality to securely obtain and store account credentials, and generate transaction data such as transaction cryptograms to conduct transactions. The transaction application may also access a networking stack to facilitate communications using a wireless communication protocol such as BLE or other suitable protocol, and to store network state information of peer network 150 such that communication device 102 can properly pair with an available access device nearby to exchange application data (e.g., to conduct a transaction).

In some embodiments, the account credentials obtained and stored by the transaction application on communication device 102 may include a token that acts as a substitute for a real account identifier. For example, the transaction application may ingest an account identifier by manual entry or by using optical character recognition to retrieve an account identifier from an image (e.g., an image of a credit card captured by a camera of communication device 102). The transaction application may then use the account identifier to request a token from a remote token service provider. Upon authenticating the user and/or communication device 102, the remote token service provider may generate or otherwise retrieve a token mapped to the account identifier, and transmit the token to communication device 102. In some embodiments, the remote token service provider may also provide a cryptogram key such as a limited-use key to communication device 102. The communications involved in the tokenization process can be encrypted using an encryption scheme such as Opacity to prevent other processes executing on communication device 102 to intercept or observe the token requests and responses.

Once the token and/or cryptogram key has been received by the transaction application, the token and/or cryptogram key can be stored in a secured environment on communication device 102 such as on a hardware secure element (e.g., SIM card), or in a trusted execution environment (TEE) such as those implemented by creating a virtual machine on communication device. In some embodiments, software cryptography approach such as white-box cryptography can be used to encrypt the token and/or cryptogram key to store them securely on communication device 102. To conduct a transaction, communication device 102 can pair with access device 104 using a wireless communication protocol such as BLE, and the transaction application executing on communication device 102 can retrieve the token and transmit it to access device 104 to request authorization for the transaction. In some embodiments, the transaction application may also generate a transaction cryptogam using the cryptogram key, and transmit the generated cryptogam with the token to access device 104.

One advantage of using an extended range wireless communication protocol such as BLE to conduct transactions is that the longer range can help reduce queues and the number of physical terminals at a merchant location. For example, by eliminating the requirement to have a user be physically next to an access device as in the case of NFC, a single access device can support multiple users positioned at different locations throughout the merchant location. In the case of a Bluetooth enabled access device, it can allow up to seven simultaneous connections. Thus, up to seven users can potentially conduct transactions with the same access device at the same time. This can be useful in environments such as restaurants (both quick service and full service) and/or shopping centers. Other scenarios may require one access device per user. For example, in the case of a vehicle trying to pair with a fuel pump or a parking meter, each access device should be paired with only one user.

In order to allow communication device 102 to properly pair with an access device in any scenario, the transaction application installed on communication device 102 may include a conflict resolver to obtain network state information of peer network 150 and determine which access device in peer network 150 is available. The network state information may include information such as the number of access devices and user communication devices in peer network 150, and which devices are connected with each other for data exchange. For example, in the multiple users per access device environment, the conflict resolver may determine which access device in peer network 150 is already connected with the maximum number of user devices, and which access device in peer network 150 is connected with less than the maximum number of user devices. The conflict resolver may then direct communication device 102 to connect with an access device that is connected with less than the maximum number of user devices. In the single user per access device scenario, the conflict resolver may determine which access device in peer network 150 is in use, and direct communication device 102 to connect with an access device that is not currently paired with a user device.

Using an extended range wireless communication protocol may also subject the system to reliability concerns due to interference and rouge pairings. As such, the transaction application installed on communication device 102 may also include an integrity checker to verify that user communication device 102 and access device 104 have successfully interchanged data, and if there is any discrepancy, the message relay can be retried for a predetermined or configurable number of times. For example, the data exchange can be packetized, and a checksum and packet length information can be included in the packet header and/or packet trailer. The recipient of the packet can verify the length and checksum, and request the packet to be resent if verification of the length or checksum fails. To improve data transfer speeds, the transaction application installed on communication device 102 may also include a message formatter that can dynamically adjust the message or packet size in the networking stack based on the data size to alter the transfer speed and reduce overhead.

Access device 104 can be, for example, a standalone access device (e.g., sale register, point-of-sale terminal, etc.), an embedded access device integrated inside another system (e.g., fuel pump, parking meter, kiosk, etc.), or a communication device such as a mobile or tablet device that can have an acceptance application installed onto the device to provide functionality to conduct a transaction with a user's communication device using a wireless communication protocol and communicate with a merchant system and/or transaction processing network. The acceptance application installed on access device 104 may provide functionality to pair with communication device 102, obtain account credentials such as an account identifier, token, and/or cryptogram from communication device 102, and transmit the account credentials to a transaction processing network (e.g., via a merchant system) to obtain authorization for a transaction.

In some embodiments, the acceptance application installed on access device 104 may include a connection handler to facilitate establishing wireless connections with communication device 102. For example, if the wireless communication protocol being used is BLE, the connection handler can configure access device 104 into a Generic Attribute (GATT) profile client that can potentially accept up to seven connections simultaneously for a multiple users use case, and into a GATT peripheral device that can only connect with one communication device for a single user per access device use case. The connection handler may also obtain network state information from peer network 150 to understand current pairing statuses to make a decision on accepting or rejecting new connections. In some embodiments, the acceptance application installed on access device 104 may also include a broadcaster to advertise the transaction service provided by access device 104. For example, when communication device 102 comes into proximity of peer network 150, communication device 102 may detect a signal (e.g., a beacon) broadcasted by access device 104 to indicate support for a wireless transaction service, and a communication device 102 may consent to using the service before establishing a secure connection for data interchange with access device 104, The broadcaster can be used to handle the broadcast and consent functions.

One concern of using an extended range wireless communication protocol such as BLE is that the longer communication range is more susceptible to interception of sensitive data such as account credentials. To ensure that sensitive data such as account credentials are protected, the acceptance application installed on access device 104 may include a certificate handler to manage security digital certificates obtained from a certificate authority. When communication device 102 connects to access device 104, access device 104 may exchange certificates with communication device 102 and verify that a legitimate certificate authority (CA) issued the certificate from communication device 102, and that the certificate is valid. The communications between communication device 102 and access device 104 can be encrypted using the public keys included in the certificates, and be decrypted by the recipient that has mutual trust established with the help of the CA. The certificate handler can be used to facilitate ingestion and dissemination of the certificate information, and ensure the certificate is stored on the device in a secured keystore execution environment so that the certificate cannot be extracted or reused by rogue processes or entities.

As described above, peer network 150 may include communication devices (including communication device 102) and access devices (including access device 104) that are communicatively coupled with each other using a wireless communication protocol such as BLE or other suitable protocol. Each device in peer network 150 may provide platform services to maintain network state information as new devices join the network, existing devices leave the network, as devices are paired to conduct transactions, and./or as devices disconnect after completing transactions. For example, the conflict resolver of communication device 102 may rely on the platform service to obtain and locally store statuses on device connections. These connections represent which user communication device is connected to which access device in peer network 150. Each device in peer network 150 may broadcast their pairing status to all other devices such that each device can obtain the latest status on which access device to connect with, and which ones to discard. The devices in peer network 150 may also maintain a handshake registrar for recordkeeping of the device pairings in the system, and a synchronization module can be used to disseminate data from the registering device to all other devices.

Certificate authority (CA) 110 can be a trusted entity such as an issuer or a transaction processor that can provide certificates to the access devices hosted by a merchant and user communication devices. CA 110 may provide services to verify certificate validity, and maintain certificate revocation lists (CRLs). In some embodiments, in order to facilitate offline transactions, the certificate verification process can be performed periodically or at a different time than the transaction such that an online process is not necessary every time a transaction is initiated. For example, CA 110 may issue a communicate device digital certificate to communicate device 102. Similarly, CA 110 may issue an access device digital certificate to access device 104. The first time that communication device 102 connects with access device 104 to conduct a transaction, the devices may exchange digital certificates, and each device may verify the received digital certificate with CA 110. Thereafter, the devices can be placed on each other's trusted device list (e.g., whitelist) such that the digital certificate verification process need not be performed the next time the two devices transact. In some embodiments, an entry on the trusted device list indicating a particular device is trusted may expire after a predetermined period of time, after which the digital certificate verification process may need to be performed again to maintain the mutual trust. In some embodiments, the entry listing may expire at the same time as the digital certificate, or have an expiry that occurs before the digital certificate expires.

Figure 2:
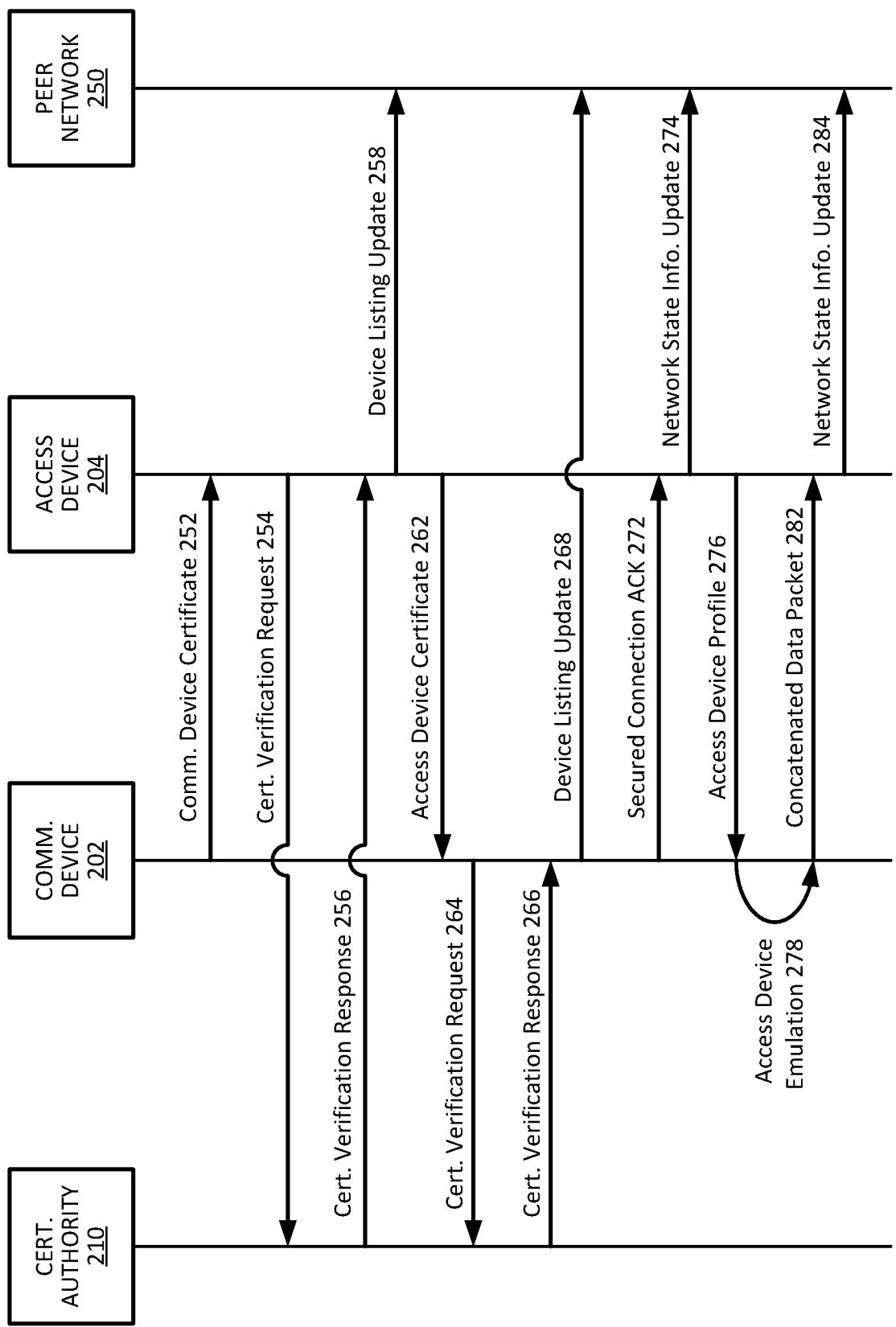
FIG. 2 illustrates a communication flow diagram of a user's communication device transacting with an access device, according to some embodiments.

FIG. 2 illustrates a communication flow diagram of a user's communication device 202 (e.g., acting as an initiating device) transacting with an access device 204 (e.g., acting as a target device), according to some embodiments. Prior to the transaction, each of communication device 202 and access device 204 may obtain a digital certificate from a certificate authority (CA) 210. For example, during installation or initialization of a transaction application on communication device 202, communication device 202 may send a request for a digital certificate to CA 210. The request may include user information to authenticate the user and/or communication device 202. Upon authenticating the user and/or communication device 202, CA 210 may issue and transmit a communication device digital certificate to communication device 202, which can be stored in a secure storage (e.g., secure element, TEE, etc.) on communication device 202. The communication device digital certificate may include a communication device public key that can be distributed by communication device 202, and data encrypted by the communication device public key can be decrypted by a communication device private key stored on communication device 202. The communication device digital certificate may also have an expiration date, and communication device 202 may renew the communication device digital certificate with CA 210 when or before the communication device digital certificate expires.

Similarly, during installation or initialization of an acceptance application on access device 204, access device 204 may send a request for a digital certificate to CA 210. The request may include merchant information of the merchant operating access device 204. Upon authenticating the merchant, CA 210 may issue and transmit an access device digital certificate to access device 204. The access device digital certificate may include an access device public key that can be distributed by access device 204, and data encrypted by the access device public key can be decrypted by an access device private key stored on access device 204. The access device digital certificate may also have an expiration date, and access device 204 may renew the access device digital certificate with CA 210 when or before the access device digital certificate expires. In some embodiments, the access device digital certificate may have a longer life span than the communication device digital certificate.

When a user operating communication device 202 first enters a merchant location and comes into proximity of peer network 250, communication device 202 may detect the presence of other devices in peer network 250 such as access device 204 that are capable of conducting a transaction with communication device 202 using a wireless communication protocol (e.g., BLE or other suitable protocol). For example, the devices at the merchant location may periodically broadcast a signal or a beacon advertising a wireless transaction service supported by the merchant location. Communication device 202 may detect the signal and recognize that the wireless transaction service being advertised is supported by the transaction application on communication device 202. Communication device 202 may then obtain network state information from one or more of the devices in peer network 150 to allow communication device 202 to join peer network 150. For example, communication device 202 may receive the network state information indicating which devices are in peer network 150 and which devices are grouped together in device clusters.

Communication device 202 may store a copy of the network state information locally on communication device 202, update the network state information to add communication device 202 to peer network 150, and transmit the updated information to one or more devices in peer network 150 to join peer network 150. Any changes to the network state information initiated by any device in peer network 150 can be propagated to all devices in peer network 150 such that the devices can update their local copy of the network state information.

When communication device 202 is ready to conduct a transaction, communication device 202 may determine that access device 204 is available based on the current network state information. Communication device 202 may transmit a connection request including the communication device digital certificate at operation 252 to access device 204 to request a secured connection be established with access device 204. The communication device digital certificate may include the public key of communication device 202, and be digitally signed by CA 210 to establish that the communication device digital certificate is authentic. Upon receiving the connection request, access device 204 acting as a target device may send a certificate verification request at operation 254 to CA 210 to request CA 210 to verify the communication device digital certificate. For example, CA 210 may verify that the communication device digital certificate was previously issued by CA 210, has not expired, and contains a valid digital signature signed by CA 210. Upon verifying the communication device digital certificate, CA 210 may send a certification verification response back to access device 204 at operation 256 to indicate whether the communication device digital certificate is valid and authentic. In some embodiments, access device 204 may be able to verify the communication device digital certificate locally. For example, access device 204 may be equipped with the public key of CA 210 to verify the digital signature of the communication device digital certificate. In some embodiments, to facilitate offline transactions, the certificate verification process can also be a periodic process or be performed at other times instead of at the time of a transaction.

Once the communication device digital certificate of communication device 202 has been verified by CA 210 and/or access device 204, access device 204 may whitelist communication device 202 as an authenticate device. The whitelisting of communication device 202 may remain valid for a predetermined period of time or until the communication device digital certificate expires, and access device 204 may omit verifying the communication device digital certificate of communication device 202 for further transactions during the whitelisting period. If verification of the communication device digital certificate fails, access device 204 may blacklist communication device 202 as an unauthorized device and prevent communication device 202 from establishing a secured connection to conduct a transaction with access device 204. The blacklisting of communication device 202 may remain valid for a predetermined period of time or until a new communication device digital certificate from communication device 202 is verified. In some embodiments, the listing of communication device 202 can be included as part of the network state information locally stored on access device 204, and access device 204 may push a device listing update at operation 258 to other devices in peer network 250. When other devices in peer network 250 receive the device listing update, they may update their own local listing to indicate whether verification of communication device 202 can be omitted (e.g., if whitelisted), or whether communication device 202 should be blocked (e.g., if blacklisted).

At operation 262, in response to verification of communication device 202, access device 204 may provide its access device digital certificate and a transaction amount to communication device 202. The access device digital certificate may include the public key of access device 204, and be digitally signed by CA 210 to establish that the access device digital certificate is authentic. In some embodiments, the transaction amount and the access device digital certificate can be encrypted using the public key of communication device 202 received in operation 252, and communication device 202 may decrypt the information using the corresponding private key of communication device 202. Upon receiving and decrypting the access device digital certificate, communication device 202 may send a certificate verification request at operation 264 to request CA 210 to verify the access device digital certificate. For example, CA 210 may verify that the access device digital certificate was previously issued by CA 210, has not expired, and contains a valid digital signature signed by CA 210. Upon verifying the access device digital certificate, CA 210 may send a certification verification response back to communication device 202 at operation 266 to indicate whether the access device digital certificate is valid and authentic. In some embodiments, communication device 202 may be able to verify the access device digital certificate locally. For example, communication device 202 may be equipped with the public key of CA 210 to verify the digital signature of the access device digital certificate. Communication device 202 may then whitelist or blacklist access device 204 depending on whether the access device digital certificate is verified similar to the process discussed above with respect to the communication device digital certificate. At operation 268, communication device 202 may push a device listing update to update the listing of access device 204 at operation 268 to other devices in peer network 250.

Upon verification of both the communication device digital certificate and the access device digital certificate, mutual trust can be stablished between communication device 202 and access device 202. The user of communication device 202 may confirm the transaction amount received in operation 262, and send an acknowledgement message at operation 272 to securely connect with access device 204. In some embodiments, the acknowledgement message can be encrypted using the public key of access device 204 received in operation 262. In response to receiving the acknowledgment message, access device 204 may update its local network state information to indicate that access device 204 is now securely connected to communication device 202 to conduct a transaction, and push a network state information update to peer network 250 at operation 274 to make other devices in peer network 250 aware that access device 204 is now in use.

At operation 276, access device 204 may provide an access device profile to communication device 202 to enable communication device 202 to emulate a virtual access device. The access device profile can be encrypted using the public key of communication device 202, and may include information such as terminal transaction data from access device 204 needed by communication device 202 to complete the transaction. For example, the access device profile may include a transaction environment identifier (e.g., a proximity payment system environment (PPSE) name) to identify the transaction environment supported by access device 204, a prioritized list of application identifiers supported by access device 204, terminal transaction qualifiers (TTQ) indicating a transaction type (e.g., chip card transaction) supported by access device 204, an unpredictable number generated by access device 204 for the transaction, and/or other information needed by communication device 202 to emulate access device 204 locally on communication device 202.

At operation 278, communication device 202 may decrypt the access device profile using the private key of communication device 202, and emulate access device 204 locally on communication device 202 using the access device profile. By emulating access device 204 locally on communication device 202, the transaction application executing on communication device 202 can exchange application data with the virtual access device using a series of application commands and application data responses (e.g., APDU commands and responses) locally on communication device 202. The application data responses can then be concatenated by the virtual access device into a data packet, be encrypted using the public key of access device 204, and be transmitted to the actual access device 204 in a single message at operation 282. This can reduce the number of messages sent between communication device 202 and access device 204 to improve reliability when using an extended range wireless communication protocol such as BLE. In some embodiments, the concatenated application data responses can be transmitted to access device 204 in more than one message, and reliability can still be improved as long as the number of messages is less than the number of application data responses that would have been otherwise required if communication device 202 is sending the application data responses directly to access device 204.

When access device 204 receives the data packet of concatenated application data responses, access device 204 can parse the data packet and generate an authorization request message for the transaction, and send the authorization request message towards an issuer to request authorization for the transaction. Access device 204 may then release the secured connection with communication device 202, update its local network state information to indicate that the communication channel is now open to conduct transactions with other devices, and push a network state information update to peer network 250 at operation 284 to make other devices in peer network 250 aware of the availability of access device 204.

Figure 3:
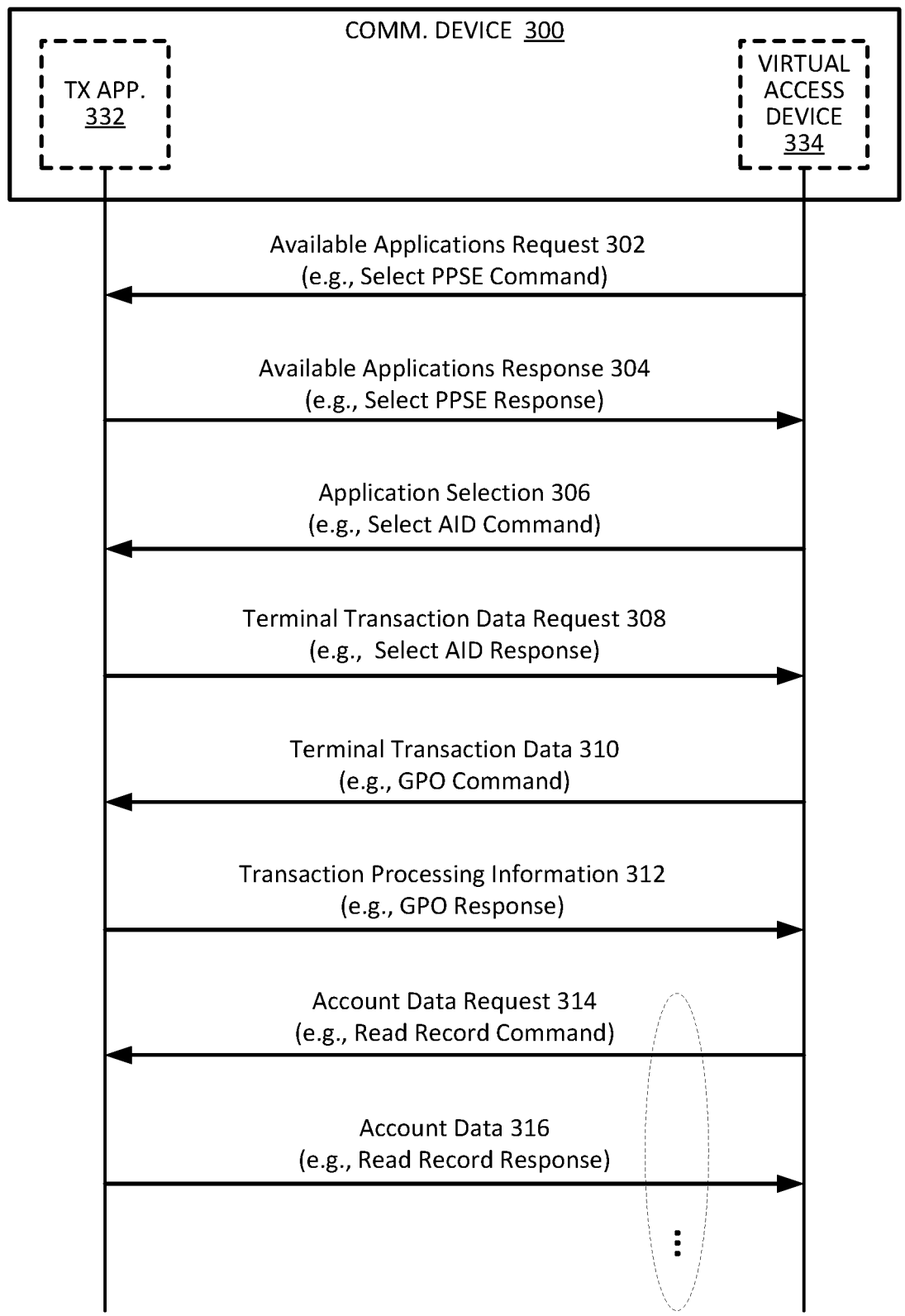
FIG. 3 illustrates an example communication flow diagram between a transaction application and a virtual access device executing on the same communication device, according to some embodiments.

FIG. 3 illustrates an example communication flow between a transaction application 332 executing on a communication device 330 and a virtual access device 334 being emulated locally on communication device 330, according to some embodiments. Virtual access device 334 can be emulated, for example, based on an access device profile obtained from an actual access device that communication device 330 is conducting a transaction with. The communications can be in the form of application commands sent from virtual access device 334 and application data responses sent from transaction application 332 in response to the application commands. In some embodiments, the application commands and data responses can be in the form of APDU commands and responses. However, it should be understood that other messages, messaging protocols, or formats can be used to exchange the application data to conduct the transaction.

To initiate the application data exchange, virtual access device 334 may initiate a transaction by sending an available applications request 302 to transaction application 332 to request information as to which payment application identifier(s) (AID(s)) may be available. Each AID may correspond to an account of the user and/or processing options associated with an account. In some embodiments, the available application(s) request 302 may be in the form of a select PPSE command. The available applications request 302 may include a payment environment identifier (e.g., a PPSE name) to identify the payment environment supported by virtual access device 334.

Upon receiving the available applications request 302, transaction application 332 may identify and process the request by recognizing the payment environment identifier (e.g., PPSE name) included in the request, and respond by sending an available applications response 304 back to virtual access device 334. The available applications response 304 may include a list of available AIDs, and may include the payment environment identifier (e.g., PPSE name) as the dedicated file name. In some embodiments, the available applications response 304 may be in the form of a select PPSE response and may include PPSE file control information (FCI). For example, the available applications response 304 may include a directory entry for each available AID. If transaction application 332 supports only one AID, transaction application 332 may respond with a single directory entry for the supported AID. If transaction application 332 supports an account with multiple AIDs, the transaction application may respond with a directory entry for each of the supported AIDs. Each directory entry may include information such as the AID, an application label associated with the AID (e.g., a mnemonic associated with the AID), an application priority indicator indicating the priority of the AID, a kernel identifier indicating the application's kernel preference, and/or additional information relating to the particular AID. The available application(s) response 304 may also include other data such as FCI issuer discretionary data.

When virtual access device 334 receives the available applications response 304, virtual access device 334 may select a suitable application from the list of applications received in the available applications response 304 (e.g., by selecting an AID from the available AID(s) received in the available application(s) response 304). In some embodiments, the selected AID can be the highest priority AID on a prioritized list of application identifiers supported by the access device being emulated by virtual access device 334. The prioritized list of application identifiers can be obtained as part of the access device profile provided by the actual access device to communication device 300. Virtual access device 334 may send an application selection 306 with the selected AID to transaction application 332 to continue the transaction. In some embodiments, the application selection 306 can be in the form of a select AID command.

Upon receiving the application selection 306, transaction application 332 may send a terminal transaction data request 308 to request transaction data from virtual access device 334 to execute the transaction using the selected application/AID. In some embodiments, the terminal transaction data request 308 may be in the form of a select AID response and may include AID file control information (FCI) with the selected AID as the dedicated file name. The terminal transaction data request 308 may include a list of transaction data identifiers to request the appropriate data from virtual access device 334, and the list of transaction data identifiers can be in the form of a processing options data object list (PDOL). The transaction data requested by transaction application 332 for the transaction may include terminal transaction qualifiers (TTQ), authorized amount, other amount, terminal country code, terminal verification results, transaction currency code, transaction data, transaction type, and/or an unpredictable number. The terminal transaction data request 308 may also include other data such as FCI issuer discretionary data, application program identifier, and language preference.

After receiving the terminal transaction data request 308, virtual access device 334 may send, to transaction application 332, the terminal transaction data 310 requested by transaction application 332. The terminal transaction data 310 provided by virtual access device 334 can be obtained from the access device profile obtained by communication device 300 from the actual access device being emulated by virtual access device 334. In some embodiments, the terminal transaction data 310 may be sent in the form of a get processing options (GPO) command, and may include the requested terminal transaction data in a processing options data object list (PDOL). In some embodiments, the terminal transaction data 310 (e.g., terminal transaction qualifiers (TTQ)) may include a transaction type indicator indicating the type of transaction supported by the access device. In some embodiments, the terminal transaction data 310 (e.g., terminal transaction qualifiers (TTQ)) may also include a consumer verification method (CVM) requirement indicator to indicate whether a CVM is required by the access device for the transaction, and also one or more CVM type indicators indicating the types of CVM supported by the access device. Examples of CVMs that may be supported by the access device can include online PIN, signature, and/or consumer device CVM (CDCVM) such as a passcode used on communication device 300 to unlock the screen or transaction application 332.

Once transaction application 332 receives terminal transaction data 310, transaction application 332 may increment its Application Transaction Counter (ATC), generate dynamic transaction processing information using at least some of the received terminal transaction data 310, and send a set of transaction processing information 312 including the generated dynamic transaction processing information to virtual access device 334. In some embodiments, the transaction processing information 312 can be sent in the form of a GPO response. In some embodiments, the transaction processing information 312 may include one or more application file locators (AFLs) that can be used as file address(es) by virtual access device 334 to read account data stored on communication device 300, and an application interchange profile (AIP) that can be used to indicate the capabilities of transaction application 332.

In some embodiments, the AFLs included in transaction processing information 312 may include file addresses to read account data such as a transaction cryptogram dynamically generated using a limited-use key (LUK) and/or unpredictable number from the access device, track-2 equivalent data including a token or a PAN, and addition data such as issuer application data (IAD), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK. In some embodiments, transaction processing information 312 may include the above account data themselves instead of their corresponding AFLs, or a combination thereof. It should also be understood that in some embodiments, the transaction processing information 312 being sent from transaction application 332 to virtual access device 334 may include some or all of the information describe above, and in some embodiments, may include additional information not specifically described.

After virtual access device 334 receives the transaction processing information 312, virtual access device 334 may send an account data request 314 to transaction application 332 to read additional account data that may be stored on communication device 300. In some embodiments, the account data request 314 may be in the form of a read record command, and may include an application file locator (AFL) indicating the location of the account data that virtual access device 334 is attempting to read. The AFL included in the account data request 314 may correspond to an AFL in the transaction processing information 312 that was provided to virtual access device 334 from transaction application 332.

In response to receiving the account data request 314 from virtual access device 334, transaction application 332 may send the account data 316 stored at the location indicated by the AFL to virtual access device 334. In some embodiments, the account data 316 may be sent in the form of a read record response. The account data 316 may include, for example, the account data elements discussed above, and/or application usage control that indicates the issuer's restrictions on the usage and services allowed for the application, the cardholder's name, customer exclusive data, issuer country code, token requester ID (e.g., if a token is used), and/or other account related data that is accessible at the AFL location. It should be understood that in some embodiments, the account data 316 being sent from transaction application 332 to virtual access device 334 may include some or all of the information describe above, and in some embodiments, may include additional information not specifically described.

In some embodiments, there can be more than one pair of account data request 314 and account data 316 communication exchange between virtual access device 334 and transaction application 332. Once virtual access device 334 has received the requisite data from the transaction processing information 312 and/or one or more account data 316 transmissions, some or all of the data elements in the transaction processing information 312 and/or one or more account data 316 transmissions can be concatenated by virtual access device 334 to form a data packet. The data packet may include a checksum and a packet length indicator to indicate the length of the data packet. The data packet can be transmitted from communication device 300 to the actual access device to allow the access device to generate a transaction authorization request message to request authorization of the transaction from the issuer. For example, in some embodiments, the transaction authorization request message may include at least the track-2 equivalent data including a token or PAN, and the transaction cryptogram generated with the LUK, and the transaction can be authorized based on at least verifying that the transaction cryptogram was generated correctly and that the LUK used in generation of the transaction cryptogram has not exhausted the LUK's set of one or more limited use thresholds.

Figure 4:
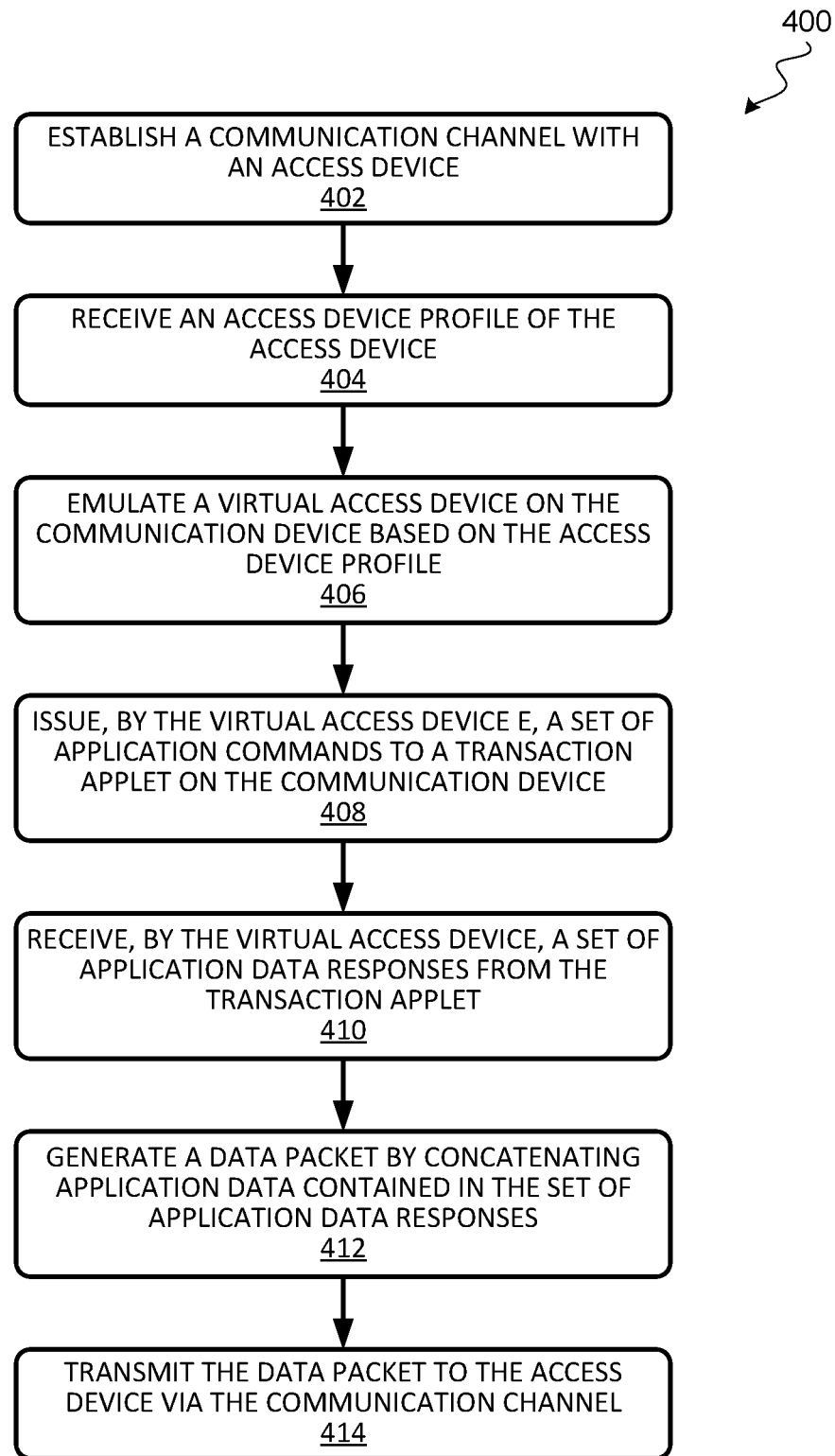
FIG. 4 illustrates a flow diagram of a process performed by a communication device for exchanging application data with an access device, according to some embodiments.

FIG. 4 illustrates a flow diagram of a process 400 performed by a communication device for exchanging application data with an access device, according to some embodiments. The communication device and the access device can be part of a peer network of devices that utilize a wireless communication protocol such as BLE, which has a longer communication range than NFC. Prior to establishing a communication channel to exchange application data, the communication device and access device may exchange digital certificates issued by a certificate authority to establish mutual trust between two devices. For example, to initiate a secured connection to carry out the data exchange, the communication device may transmit a communication device digital certificate to the access device. The access device may verify the communication device digital certificate prior to transmitting additional information about the access device to the communication device such as an access device profile of the access device. The communication device may also receive an access device digital certificate from the access device, and verify the access device digital certificate prior to executing further functions to facilitate the data exchange such as emulation of the access device.

At operation 402, in response to verification of the digital certificates, the communication device may establish a secured communication channel with the access device, for example, by sending an acknowledgment message to the access device to indicate that the digital certificates exchange was successful and that the certificates are valid. In some embodiments, the acknowledgement message can be encrypted using an access device public key that was included in the access device digital certificate transmitted to the communication device. Upon receiving the acknowledgement message, the access device can decrypt it using the access device's private key, and allow the secured connection with the communicate device if the acknowledgement message can be properly decrypted.

At operation 404, the communication device may receive an access device profile of the access device from the access device. The access device profile may include access device parameters to enable the communication device to emulate a virtual access device locally on the communication device itself to reduce the number of external transmissions needed to exchange application data between the devices. For example, the access device profile may include a prioritized list of application identifiers supported by the access device, an unpredictable number generated by the access device, and/or other terminal transaction data/parameters that the access device may use or provide to the communication device to obtain application data to complete a transaction. In some embodiments, the access device profile can be encrypted using a communication device public key that was included in the communication device digital certificate provided to the access device.

At operation 406, the communication device may emulate a virtual access device locally on the communication device itself based on the access device profile. For example, the communication device may instantiate a virtual machine and execute programming code that provides access device functionalities such as issuing application commands (e.g., APDU commands) to a transaction applet to obtain account data for a transaction. Information in the access device profile may allow the emulated virtual access device to generate appropriate commands based on the characteristics of the actual access device. In some embodiments, if the received access device profile is encrypted, the communication device may decrypted the access device profile using the communication device private key.

At operation 408, the virtual access device executing on the communication device may issue a set of application commands to a transaction applet executing on the communication device, and receive, at operation 410, a set of application data responses from the transaction applet in response to the set of application commands. In some embodiments, the application commands and data responses can be in the form of APDU commands and responses. In some embodiments, the virtual access device may wait for an application data response from the transaction applet after each application command before sending the next application command.

By way of example, as part of operation 408, the virtual access device may send a command to the transaction applet to request a list of application identifiers available to the transaction applet, where each application identifier may correspond to an account or a set of processing options for an account. In response, the transaction applet may provide a list of available application identifiers as part of operation 410. The virtual access device may then, as part of operation 408, send a select application identifier command to select an application identifier from a list of available application identifiers associated with the transaction applet. The select application identifier command can be generated by the virtual access device based on a prioritized list of application identifiers included in the access device profile. The application command and data response exchange may continue according to the communications exchange described with respect to FIG. 3. For example, the communications exchange may further include the virtual access device sending an application command with an unpredictable number to the transaction applet. The unpredictable number can be a number generated by the actual access device and included in the access device profile. The transaction applet may respond by sending an application data response that includes a transaction cryptogram generated by the transaction applet using the unpredictable number (e.g., by encrypting at least the unpredictable number using a limited-use key). In some embodiments, the set of application data responses may include a set of application file locators containing memory addresses to account information, and the set of application command may include a set of read record commands to read the account information using the application file locators. Each read record command may include an application file locator. The set of application data responses may further include a set of read record responses from the transaction applet containing account information corresponding to the AFLs.

At operation 412, after the necessary application data from the transaction applet has been obtained by the virtual access device, the communication device may generate a data packet by concatenating multiple application data elements contained in the set of application data responses (e.g., read record responses). For example, the application data responses may include application data such as a token or a PAN, a transaction cryptogram, account expiry information, and other data elements described with reference to FIG. 3, and these data elements can be concatenated into a data packet. A checksum can be computed over the data elements, and the checksum and a length of the data packet can be added to a header of the data packet.

At operation 414, the communication device may transmit the data packet to the external access device using the established secured communication channel. In some embodiments, the data packet can be encrypted using the access device public key included in the access device digital certificate that was provided to the communication device. The access device may then decrypt the data packet using the access device private key, check the integrity of the data packet to ensure there are no transmission errors by recalculating the checksum and verifying the length of the data packet, parse the data packet, and generate an authorization request message to obtain authorization for the transaction. In some embodiments, if transmission errors are detected, the access device may transmit a resend request to the communication device to request the communication device to re-transmit the data packet.

Figure 5:
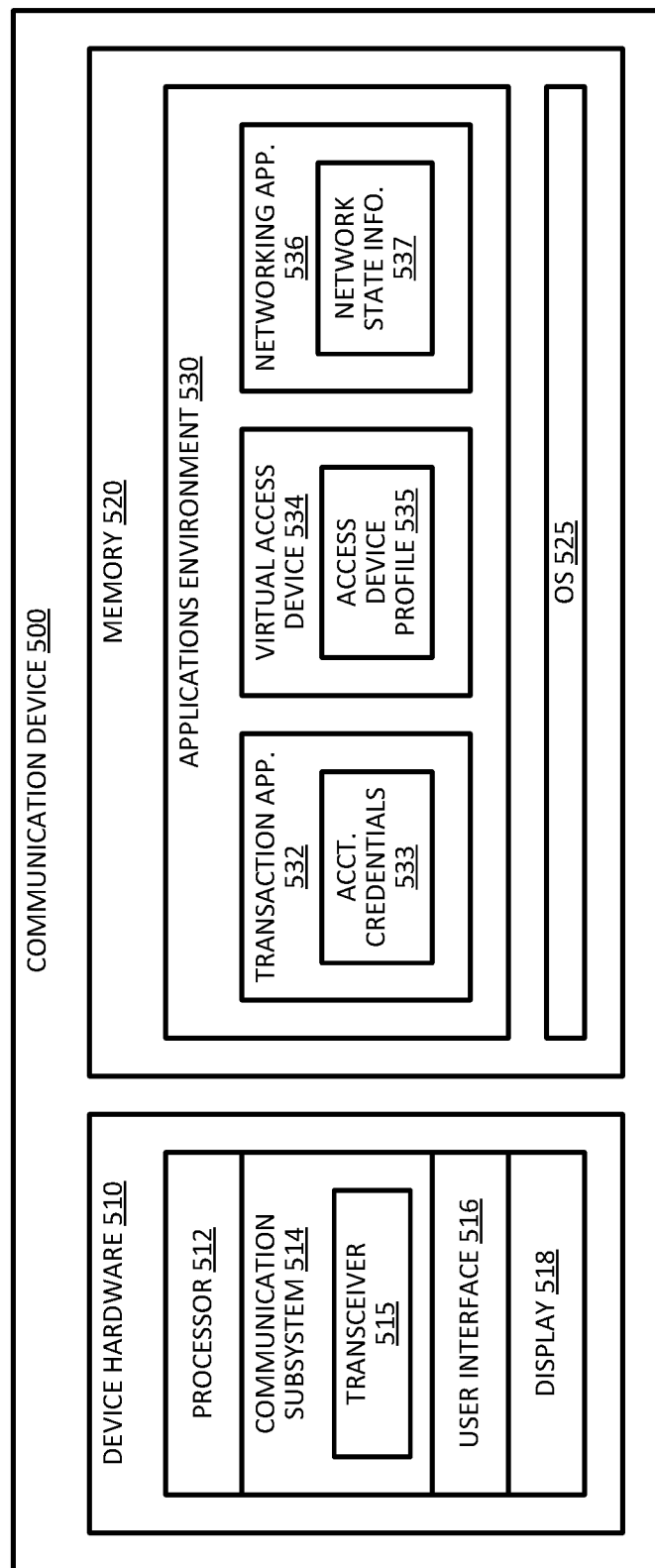
FIG. 5 illustrates a block diagram of a communication device, according to some embodiments.

FIG. 5 illustrates a block diagram of a communication device 500, according to some embodiments. In some embodiments, communication device 500 can be a mobile device operated by a user. Communication device 500 may include device hardware 510 coupled to a memory 520. Device hardware 510 may include a processor 512, a communication subsystem 514 with one or more transceivers 515 capable of communicating with an external device using a wireless communication protocol such as BLE, and a user interface 516. In some embodiments, device hardware 510 may also include a display 518 (which can be part of user interface 516). Processor 512 can be implemented as one or more integrated circuits (e.g., one or more single core or multicore microprocessors and/or microcontrollers), and is used to control the operation of communication device 500. Processor 512 can execute a variety of programs in response to program code or computer-readable code stored in memory 520, and can maintain multiple concurrently executing programs or processes. User interface 516 can include any combination of input and output elements to allow a user to interact with and invoke the functionalities of communication device 500. In some embodiments, user interface 516 may include a component such as display 518 that can be used for both input and output functions.

Memory 520 can be implemented using any combination of any number of non-volatile memories (e.g., flash memory) and volatile memories (e.g., DRAM, SRAM), or any other non-transitory storage medium, or a combination thereof media to store computer executable code. Memory 520 may store an operating system (OS) 525 and an applications environment 530 where one or more applets and/or applications executable by processor 512 reside. Applications environment 530 may include a transaction applet 532, an emulator to emulate a virtual access device 534, and a networking applet 536. In some embodiments, transaction applet 532, virtual access device 534, and/or networking applet 536 can be integrated as part of one or more applications such as a transaction application (e.g., wallet or payment application, merchant application, etc.).

Transaction applet 532 can be an applet that uses, accesses, and/or stores sensitive information such as account credentials 533 (e.g., account identifiers, tokens, etc.). Transaction applet 532 can support multiple accounts and multiple application identifiers to support different transaction processing options. In some embodiments, access to transaction applet 532 by a user can be protected by user authentication data such as a password, passcode, PIN, etc. For example, when a user attempts to launch or execute transaction applet 532, the user may be requested to enter valid user authentication data before the user can access transaction applet 532. Account credentials 533 may store sensitive information such as account credentials (e.g., PAN, token) and other account parameters such as a limited-use key that are used to conduct a transaction, and transaction applet 532 may provide functionality to retrieve the token and/or limited-use key from a remote server. Transaction applet 532 may include a cryptography module to provide cryptographic functionalities for transaction applet such as to encrypt and decrypt communications and/or to generate transaction cryptograms. For example, the cryptography module may implement and perform encryption/decryption operations for transaction applet 532 using encryption algorithms such as DES, AES, TDES/TDEA, or the like, and/or hash functions such as SHA, or the like. When transaction applet 532 accesses account credentials 533 such as a token or limited-use key stored to conduct a transaction, transaction application 533 may invoke the cryptography module to generate a transaction cryptogram based on the limited-use key and/or token.

Virtual access device 534 can be an instance of an emulated access device executing on communication device 500. Virtual access device 534 may include or have access to an access device profile 535 that was obtained from an external access device that is being emulated by communication device 500. Virtual access device 534 may provide access device functionalities such as selecting application identifiers to process a transaction, issue application commands such as APDU commands to provide transaction applet 532 with transaction parameters (e.g., transaction qualifiers, transaction amount, unpredictable number, etc.) to complete a transaction, receives application data responses from transaction applet 532, and generate one or more data packets based on the responses from transaction applet 532 for transmission to the external access device.

Networking applet 536 can be used by communication device 900 to join a device network and establish a secure channel with an access device to conduct a transaction. For example, networking applet 536 may support a wireless communication protocol such as BLE. Networking applet 536 can detect nearby devices employing the same wireless communication protocol and support a transaction service using the protocol. Networking applet 536 may obtain network state information from other devices in the network and store it locally as network state information 537. Network state information 537 may include a mapping of which devices in the network are grouped together in device clusters, which communication device in the device network is currently paired with which access device to conduct a transaction, and which access device in the device network is available. Network state information 537 can also be used by communication device 500 to direct it to an available access device to carry out an application data exchange to conduct a transaction.

Although certain aspects of the techniques disclosed herein has been described using BLE as an exemplary wireless communication protocol, it should be understood that the techniques described herein can be applied to other wireless communication protocols including protocols that utilize one or more radio frequencies as a transmission medium. Furthermore, while certain aspects have been described in the context of conducting a transaction, the secured data exchange techniques disclosed herein can be applied to transmission of other types of sensitive data.

The techniques described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

One or more features from any embodiment may be combined with one or more features of any other embodiment without departing from the scope of the invention.

A recitation of "a," "an," or "the" is intended to mean "one or more" unless specifically indicated to the contrary.

What is claimed is:

1. A method for secured extended range application data exchange, the method comprising:
   establishing, by a communication device, a communication channel with an access device;
   receiving, by the communication device, an access device profile of the access device;
   emulating, by the communication device, a virtual access device on the communication device based on the access device profile;

issuing, by the virtual access device executing on the communication device, a set of application commands to a transaction applet executing on the communication device;

receiving, by the virtual access device executing on the communication device, a set of application data responses from the transaction applet in response to the set of application commands;

generating, by the communication device, a data packet by concatenating application data contained in the set of application data responses; and transmitting, by the communication device, the data packet to the access device via the communication channel, wherein the access device thereafter generates an authorization request message comprising data in the data packet and sends the authorization request message to an authorizing entity which authorizes the authorization request message.

2. The method of claim 1, further comprising:

receiving, by the communication device, an access device digital certificate from the access device; and verifying, by the communication device, the access device digital certificate prior to emulating the virtual access device.

3. The method of claim 2, wherein the access device digital certificate includes an access device public key, and the data packet is encrypted by the communication device using the access device public key prior to transmitting the data packet to the access device.

4. The method of claim 1, further comprising:

transmitting, by the communication device, a communication device digital certificate to the access device prior to receiving the access device profile, wherein the communication device digital certificate is verified by the access device prior to transmission of the access device profile to the communication device.

5. The method of claim 1, wherein the access device profile includes a prioritized list of application identifiers supported by the access device.

6. The method of claim 5, wherein the set of application commands includes a select application identifier command that is generated by the virtual access device based on the prioritized list of application identifiers to select an application identifier from a list of available application identifiers associated with the transaction applet.

7. The method of claim 1, wherein the access device profile includes an unpredictable number generated by the access device.

8. The method of claim 7, wherein the set of application data responses includes a transaction cryptogram generated by the transaction applet using the unpredictable number provided to the transaction applet by the virtual access device.

9. The method of claim 1, wherein the application data being concatenated to generate the data packet includes application data in a plurality of read record responses from the transaction applet.

10. The method of claim 1, wherein the communication channel established between the communication device and the access device is a wireless communication channel having a longer communication range than near field communication (NFC).

11. A communication device for secured extended range application data exchange, the communication device comprising:

a processor; and a memory storing code executable by the communication device to implement operations including:

establishing a communication channel with an access device;

receiving an access device profile of the access device;

emulating a virtual access device on the communication device based on the access device profile;

issuing, by the virtual access device executing on the communication device, a set of application commands to a transaction applet executing on the communication device;

receiving, by the virtual access device executing on the communication device, a set of application data responses from the transaction applet in response to the set of application commands;

generating a data packet by concatenating application data contained in the set of application data responses; and transmitting the data packet to the access device via the communication channel, wherein the access device is configured to generate an authorization request message comprising data in the data packet and send the authorization request message to an authorizing entity which authorizes the authorization request message.

12. The communication device of claim 11, wherein the operations further include:

receiving an access device digital certificate from the access device; and verifying the access device digital certificate prior to emulating the virtual access device.

13. The communication device of claim 12, wherein the access device digital certificate includes an access device public key, and the data packet is encrypted by the communication device using the access device public key prior to transmitting the data packet to the access device.

14. The communication device of claim 11, wherein the operations further include:

transmitting a communication device digital certificate to the access device prior to receiving the access device profile, wherein the communication device digital certificate is verified by the access device prior to transmission of the access device profile to the communication device.

15. The communication device of claim 11, wherein the access device profile includes a prioritized list of application identifiers supported by the access device.

16. The communication device of claim 15, wherein the set of application commands includes a select application identifier command that is generated by the virtual access device based on the prioritized list of application identifiers to select an application identifier from a list of available application identifiers associated with the transaction applet.

17. The communication device of claim 11, wherein the access device profile includes an unpredictable number generated by the access device.

18. The communication device of claim 17, wherein the set of application data responses includes a transaction cryptogram generated by the transaction applet using the unpredictable number provided to the transaction applet by the virtual access device.

19. The communication device of claim 11, wherein the application data being concatenated to generate the data packet includes application data in a plurality of read record responses from the transaction applet.

20. The communication device of claim 11, wherein the communication channel established between the communication device and the access device is a wireless communication channel having a longer communication range than near field communication (NFC).

\* \* \* \* \*